INVENTOR.
James W. Jacobs
BY
HIS ATTORNEY

United States Patent Office 3,294,879
Patented Dec. 27, 1966

3,294,879
METHOD FOR MAKING POLYURETHANE FOAM
James W. Jacobs, Dayton, Ohio, assignor to General Motors Corporation, Detroit, Mich., a corporation of Delaware
Filed Oct. 30, 1962, Ser. No. 234,084
1 Claim. (Cl. 264—26)

This invention relates to polyurethanes and to methods for reacting ingredients to form said polyurethanes.

It is, therefore, an object of the invention to provide a method for reacting ingredients capable of forming a polyurethane under conditions whereby the reaction may be closely controlled and an improved product may be formed.

In carrying out the above object it is a further object of the invention to react the polyurethane forming ingredients, namely a polyisocyanate and a suitable polymeric material under the influence of microwave energy whereby the reaction may be closely controlled to produce a more uniform polyurethane material.

A still further object is to provide a method for reacting polyisocyanates with polymeric materials such as polyesters, polyethers, polyesteramides and the like under the influence of microwave energy whereby cellular products may be formed either rigid or flexible, according to the initial reactants, and wherein the cell structure may be closely controlled to provide a uniform cell structure throughout the material with a reduced skin effect and wherein the foamed material may be controlled in density to produce lower densities when desired than is possible by following prior art methods.

Another object of the invention is to utilize microwave energy within a satisfactory range of frequencies to provide the desired reaction.

A still further object of the invention is to provide a method for reacting polyurethane forming ingredients under the influence of microwave energy wherein the rate of reaction may be closely controlled through modulation of the frequency and/or power input to vary the microwave energy.

Further objects and advantages of the present invention will be apparent from the following description, reference being had to the accompanying drawings wherein a diagrammatic showing of an apparatus for carrying out the method is illustrated.

Figure 1:
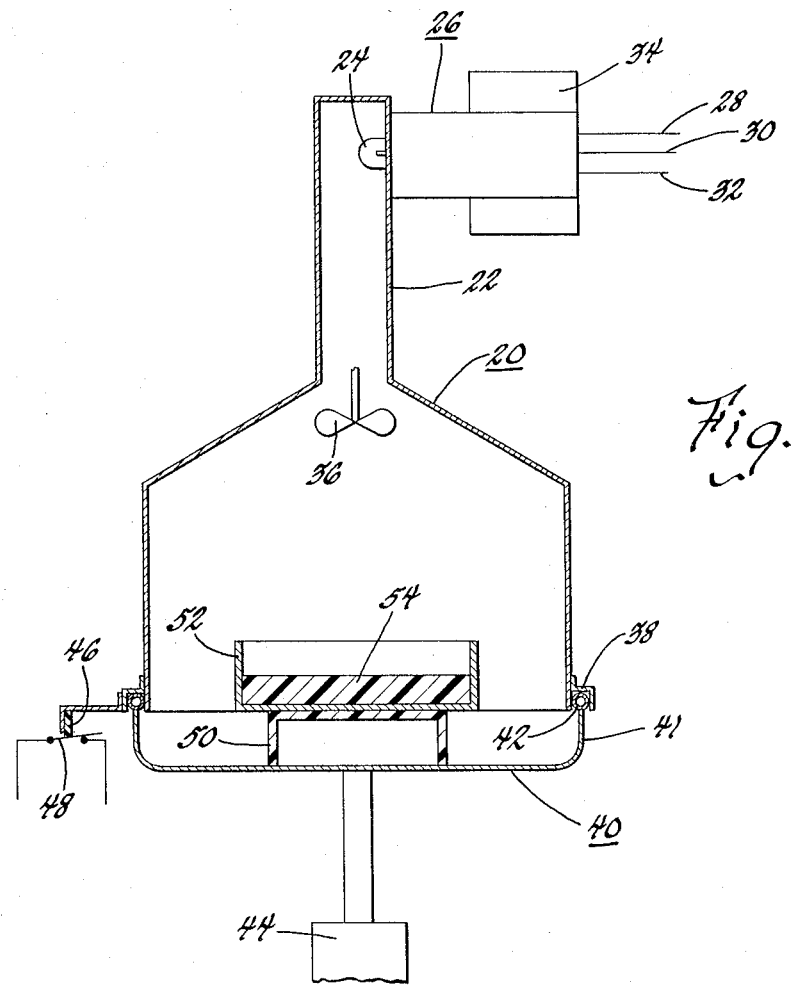
FIGURE 1 is a diagrammatic view of an apparatus for carrying out the method wherein a magnetron assembly is shown in association with a wave guide column and a housing.

One type of apparatus which can be used to employ the influence of microwave energy during the reaction of polyurethane forming ingredients is shown in FIGURE 1 wherein an upper metal housing 20 is used which has an upright wave guide column 22 at the upper end thereof into which extends a magnetron 24, or other suitable microwave emitter which is supported on a magnetron assembly 26 (microwave generator, etc.) that, inturn, is connected to an electronic power source through lead-in wires 28, 30 and 32. In close association with the magnetron assembly 26 is a cooling means or device 34 which may be a water cooling jacket or similar equipment. At the base of the wave guide column there may be positioned a stirrer 36 in the form of a paddle which may be rotated by means not shown. The stirrer 36 is optional in accordance with the results desired. The housing 20 has around its lower periphery a channel 38 which is adapted to seal with a lower metal housing or support 40 that has an upturned flange 41. Around the upper periphery of the flange 41 is a metal braid or other resilient metallic sealing means 42. As will be seen, when the upper housing 20 and the lower support 40 are in closed or contacting position as shown in FIGURE 1, the braid 42 fits within the channel 38 to form an electromagnetic wave shield. The lower support 40 is carried by an elevating device 44 of any suitable design so that the assembly may be raised or lowered relative to the upper housing 20 which is preferably maintained stationary due to the attached magnetron assembly, etc. Obviously, if it is desired to maintain the bottom portion stationary and move the top, such can be accomplished.

It will be noted that an insulated finger 46 extends outwardly from the upper housing 20 adapted to engage a microswitch shown diagrammatically at 48 for closing the same when the housing 20 is in seated engagement upon the lower support 40. The microswitch 48 is biased to open position and will open when the lower support 40 is moved out of association with the housing 20. The switch 48 is an interlock connected into the circuitry of the electronic power supply whereby the magnetron can only be energized when the two parts 20 and 40 are in an electrically contacting relation with one another.

Figure 2:
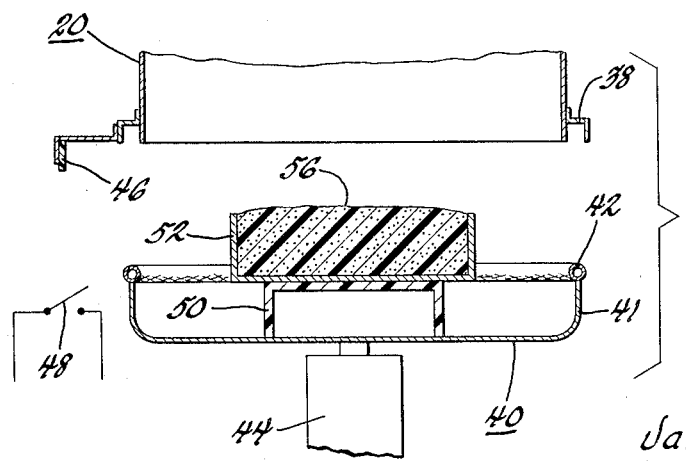
FIGURE 2 is a fragmentary view of FIGURE 1 in the expanded or open position.

Within the lower housing 40 is a plastic support or table 50 preferably made of polyester resin, glass or some similar material with a low coefficient of absorption. Upon this table 50 may be positioned a mold 52 made of metal or plastic as desired. Within the mold 52 is placed a predetermined quantity 54 of polyurethane forming ingredients and when the device is in closed position as shown in FIGURE 1 and the magnetron is operative the microwave energy influences the reaction under the control of the device so that the various ingredients react to cause a rise of the reacting mixture, in the case of foam, to a position as shown in 56 in FIGURE 2. When this is accomplished, suitable controls (not shown) such as a height control or a temperature control which may be buried in the reactants, deenergizes the magnetron assembly to substantially stop the reaction. Thereafter the housing 20 and lower metal support 40 may be separated and the mold removed with the reacted material therein. Obviously, if solid polyurethanes are being processed there will be no rise of the ingredients but merely a reaction therebetween involving a rise in temperature.

The electrical hookup of the magnetron assembly and details thereof are well known in the art; however, a specific hookup that may be used in connection with the device as shown here is illustrated in copending application Ser. No. 234,085, filed concurrently herewith and assigned to the assignee here and now Patent No. 3,209,056.

It is to be understood that the principles set forth in this application may be used in the production of all types of polyurethane materials whether solid, cellular, flexible or rigid. For example, foams such as are described in copending application Serial No. 809,702 filed April 29, 1959, assigned to the assignee here, may be produced and controlled through the use of the present method. In the foregoing application, rigid foams having the cells substantially filled with a retained halogen substituted hydrocarbon are disclosed which foams are highly useful for insulating materials and the like. On the other hand, if $CO_2$ blown foams are desired either rigid or flexible, the hydrocarbons may be eliminated and formulations of the general type disclosed in the aforementioned application may be used with the addition of small quantities of water to initiate the formation of the $CO_2$ during the reaction. In all cases, however, due to the specific function of the microwave energy, the use of the catalyst may be reduced and in some cases completely eliminated if proper controls are provided.

These deviations are possible due to the extremely uniform distribution of microwave energy throughout the reaction mass whereby molecules of the reactants are activated by the field so that uniform heating is obtained whereby the entire mass reacts simultaneously and uniformly. This makes possible more uniform temperatures during the reaction than are normally possible during the usual reaction where high temperatures are involved in portions of the reacting mass which are isolated by the remainder of the materials in the mass due to its low heat conductivity so that various portions of the mass become fully reacted while other portions of the mass, which are in contact with the atmosphere, may not react completely during the same time period. These variations within the reacting mass are the cause for nonuniform cell size, heavy crusts on external surfaces of the mass and other undesirable conditions which have always created difficulties in the production of materials of this character. By absorbing uniform energy in the form of heat throughout the entire reacting mass simultaneously, I have found that it is possible to produce a more uniform material wherein a more complete reaction is accomplished throughout the reaction mass.

These statements are proven by the fact that two reaction mixtures having identical materials therein and in identical quantities were reacted with greatly dissimilar results. In the material subjected to microwave energy, the density was lower resulting in a greater volume of foam, and the cell distribution was more uniform than in the material made through normal procedures with the catalyst as a means for initiating and progressing the reaction.

In all instances, due to the uniformity of reaction throughout the mass and the uniformity of temperatures involved, shear effect is reduced and in most instances eliminated entirely, whereby one of the major problems in the casting of foams is overcome. Also, bread-loafing of material formed in open molds is drastically reduced due to the uniformity of the reaction whereby waste or scrap material is substantially eliminated.

In any of the formulas to follow, variations well known within the art may be made. In other words, the quantities of reactants may vary in accordance with their acid number and/or hydroxyl number wherein stoichiometric quantities may be used to produce satisfactory polyurethane materials. The chemical formulations of these materials form no part of this invention which is specifically directed to the method of activating the ingredients to produce a controlled reaction through the use of microwave energy.

Various polyesters, polyethers and polyesteramides, etc., may be used for the production of polyurethanes, polyesters and polyesteramides may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or alcohols such as ethanolamine and aminopropanol, etc., Alkylene glycols and polyoxyalkylene glycols which may be used include ethylene glycol, propylene glycol, styrene glycol, diethylene glycol, polyethylene glycol, and polypropylene glycol and copolymers of these glycols, etc. Polyethers may be formed by reacting polypropylene oxide, or ethylene oxide, for example, with sorbitol, trimethylolpropane, pentaerythritol, sucrose, methyl glucoside, phenol, etc.

Suitable organic polyisocyanates for use in the reaction include aromatic diisocyanates such as toluene-2,4-diisocyanate, toluene-2,6-diisocyanate and mixtures thereof, ethylene diisocyanate, propylene-1,2-diisocyanate, butylene - 1,3 - diisocyanate, hexylene - 1,6 - diisocyanate, triphenylmethane diisocyanate, 1,5-polyphenol methane isocyanate.

Specific examples of polyurethanes made from various reaction mixtures together with their properties are as follows:

*Example 1.—Rigid polyester foam*

100 parts by weight of a prepolymer made from 75 parts of a polyisocyanate mixture comprising 80 parts of 2,4-toluene diisocyanate and 20 parts of 2,6-toluene diisocyanate together with 25 parts by weight of a Polyester A as defined hereinafter and 20 parts of 2,6-toluene trichloromonofluoromethane are placed in a container and are mixed and stored at about 70° F. at atmospheric pressure. A mixture of the same Polyester A is placed in another container together with an activator consisting of 9.4 parts of ethylene glycol (anhydrous), 1 part of dimethylethanolamine and 1 part by weight of organosilicone surfactant wherein the proportions by weight are 60 parts of Polyester A to 11.4 parts of the activator. This mixture is maintained at atmospheric pressure at 75° F. Materials from the two containers are then placed in a mixing chamber in proportions by weight of 120 parts from the prepolymer container to 71.4 parts from the polyester container. This mixture is then discharged as a 50 gram mass into a reaction mold shown at 52 in the drawing and when exposed for 20 seconds to microwave energy at 2453 megacycles frequency and 685 watts available intensity, a rigid polyester foam developed and gelled in 40 seconds from initial exposure and had a density of 1.81 lb../cu. ft. This foam is 93% closed cell and the fluorohydrocarbon is retained within the cells according to IR spectrographic analysis.

This compares with an identical sample reacted without the advantages of microwave exposure. In this case the density was 2 lb./cu. ft. with 94% closed cell with the fluorohydrocarbon being retained according to IR spectographic analysis.

Polyester A as above noted is made up of:

| | |
|---|---|
| Phthalic anhydride | 2 |
| Adipic acid | 10 |
| TMP-2,2-dihydroxymethyl, 1-butanol | 18 |
| Lead (as metallic lead by weight), percent | .030 |
| OH No. | 440 |
| Acid No. max. | 1.5 |
| $H_2O$ max. (percent by weight) | .15 |
| Viscosity (cps.) at 165° F. | 2900 |

(All quantities expressed in mols unless otherwise noted.)

*Example 2.—Rigid polyester foam*

An identical material to that set forth in Example 1 was made under the same conditions except that .25 part of dimethylethanolamine instead of the 1 part was used. The foam was exposed to microwave energy for 25 seconds at 2453 megacycles frequency and 685 watts available intensity. A rigid polyester foam was developed which gelled within 58 seconds from initial exposure and had a density of 1.85 lbs./cu. ft. This foam is 95.8% closed cell and the fluorohydrocarbon is retained within the cells according to IR spectrographic analysis.

This compares with an identical sample reacted without the advantages of microwave exposure which had a density of 2.2 lbs./cu. ft. with a gel time of 73 seconds and 95.9% closed cell.

*Example 3.—Rigid polyester foam*

100 parts by weight of a prepolymer made from 75 parts of a polyisocyanate mixture comprising 80 parts of 2,4-toluene diisocyanate and 20 parts of 2,6-toluene diisocyanate together with 25 parts by weight of a Polyester A (as noted in Example 1) and 20 parts by weight of trichloromonofluoromethane are placed in a container and are mixed and stored at about 70° F. at atmospheric pressure. A mixture of the same Polyester A is placed in another container together with an activator consisting of 9.4 parts of ethylene glycol and 1 part by weight of organo-silicone surfactant wherein the proportions by weight are 60 parts of the Polyester A to 10.4 parts of the activator. This mixture is maintained at atmospheric pressure at 75° F. Materials from the two containers are then placed in a mixing chamber in proportions by weight of 120 parts from the prepolymer tank to 70.4 parts by weight from the polyester container. This mixture is then discharged as a 50 gram mass into a reaction mold shown at 52 and when exposed for 30 seconds to microwave energy at 2543 megacycles frequency and 685 watts available intensity a rigid polyester developed and gelled in 85 seconds from initial exposure and had a density of 2.4 lbs./cu. ft. This foam is 89.5% closed cell and the fluorohydrocarbon is retained within the cells according to IR spectrographic analysis.

This compares with an identical sample reacted without the advantages of microwave exposure which had a density of 2.6 lbs./cu. ft. with a gel time of nine minutes.

*Example 4.—Rigid polyester foam $CO_2$ blown*

100 parts by weight of a prepolymer made from 75 parts of a polyisocyanate mixture comprising 80 parts of 2,4-toluene diisocyanate and 20 parts of 2,6-toluene diisocyanate together with 25 parts by weight of a Polyester A as defined herein, is placed in a container and is stored at about 70° F. at atmospheric pressure. A mixture of the same Polyester A is placed in another container together with an activator consisting of .25 part of dimethylethanolamine and 1 part by weight of organo-silicone and surfactant and 2½ parts of water wherein the proportions by weight are 50 parts of the Polyester A to 4.25 parts of the activator. This mixture is maintained at atmospheric pressure at 70° F. Materials from the two containers are then placed in a mixing chamber in proportions by weight of 100 parts from the prepolymer container to 54.25 parts from the polyester container. This mixture is then discharged as a 50 gram mass into a reaction mold shown at 52 and exposed for 40 seconds at 2453 megacycles frequency and 685 watts available intensity and gelled in 75 seconds from initial exposure and had a density of 1.46 lb./cu. ft.

This compares with an identical sample reacted without the advantages of microwave exposure which had a density of 1.8 lb./cu. ft. with a gel time of 125 seconds.

*Example 5.—Rigid polyether foam*

100 parts by weight of a prepolymer made from 79 parts of a polyisocyanate mixture comprising 80 parts of 2,4-toluene diisocyanate and 20 parts of 2,6-toluene diisocyanate together with 21 parts by weight of a Polyether A as defined hereinafter, is placed in a container and is stored at about 70° F. at atmospheric pressure. A mixture of the same Polyether A is placed in another container together with an activator consisting of 2 parts of tetramethyl butane diamine and 1 part of organo-silicone surfactant and 38 parts of trichloromonofluoromethane wherein the proportions by weight are 87 parts of Polyether A to 3 parts of the activator. This mixture is maintained at atmospheric pressure at 70° F. Materials from the two containers are then placed in a mixing chamber in proportions by weight of 100 parts from the prepolymer container to 128 parts from the polyether container. This mixture is then discharged as a 50 gram mass into a reaction mold shown at 52 and exposed for 20 seconds at 2453 megacycles frequency and 685 watts available intensity and gelled in 60 seconds from initial exposure and had a density of 1.69 lbs./cu. ft. The foam had 92.3% closed cells and the fluorohydrocarbon was retained according to IR spectrograph analysis.

This compares with an identical sample reacted without the advantages of microwave exposure which had a density of 1.86 lbs./cu. ft. and gel time of 65 seconds. The foam had 91.4% closed cells and the fluorohydrocarbon was retained according to IR spectrograph analysis.

Polyether A as above noted is made up of:

| | |
|---|---|
| Sucrose | 1 |
| Propylene oxide | 11 |
| Ethylene oxide | 4 |
| OH No. | 445–470 |
| $H_2O$ max. (percent by weight) | .15 |
| Viscosity (cps.) at 25° C. | 22,000–32,000 |
| pH | 3.5–5 |

(All quantities expressed in mols unless otherwise noted.)

*Example 6.—Rigid polyether foam*

100 parts by weight of a prepolymer made from 79 parts of a polyisocyanate mixture comprising 80 parts of 2,4-toluene diisocyanate and 20 parts of 2,6-toluene diisocyanate together with 21 parts by weight of a Polyether A as defined herein, is placed in a container and is stored at about 70° F. at atmospheric pressure. A mixture of the same Polyether A is placed in another container together with an activator consisting of .5 part of tetramethyl butane diamine and 1 part of organo-silicone surfactant, and 38 parts of trichloromonofluoromethane wherein the proportions by weight are 87 parts of the Polyether A to 3 parts of the activator. This mixture is maintained at atmospheric pressure at 70° F. Materials from the two containers are then placed in a mixing chamber in proportions by weight of 100 parts from the prepolymer container to 126½ parts from the polyether container. This mixture is then discharged as a 50 gram mass into a reaction mold shown at 52 and exposed for 45 seconds at 2453 megacycles frequency and 685 watts available intensity and gelled in 120 seconds from initial exposure and had a density of 1.56 lbs./cu. ft. The foam had 90.5% closed cells and the fluorohydrocarbon was retained according to IR spectrograph analysis.

The same materials were exposed in the mold 52 for 67 seconds at 915 megacycles frequency and 685 watts available intensity and gelled in 195 seconds from initial exposure and had a density of 1.50 lbs./cu. ft. The foam had 90.5% closed cells and the fluorohydrocarbon was retained according to IR spectrograph analysis.

The above compare with an identical sample reacted without the advantages of microwave exposure which had a density of 1.94 lbs./cu. ft. and a gel time of 248 seconds. The foam had 92.4% closed cells and the fluorohydrocarbon was retained according to IR spectrograph analysis.

*Example 7.—Rigid polyether foam*

100 parts by weight of a prepolymer made from 79 parts of a polyisocyanate mixture comprising 80 parts of 2,4-toluene diisocyanate and 20 parts of 2,6-toluene diisocyanate together with 21 parts by weight of a Polyether A as defined herein, is placed in a container and is stored at about 70° F. at atmospheric pressure. A mixture of the same Polyether A is placed in another container together with an activator consisting of 1 part of tetramethyl butane diamine and 1 part by weight of organo-silicone surfactant, and 38 parts of trichloromonofluoromethane wherein the proportions by weight are 87 parts of the Polyether A to 2 parts of the activator. This mixture is maintained at atmospheric pressure at 70° F. Materials from the two containers are then placed in a mixing chamber in proportions by weight of 100 parts from the prepolymer container to 127 parts from the polyether container. This mixture is then discharged as a 50 gram mass into a reaction mold shown at 52 and exposed for 123 seconds at 915 megacycles frequency and 685 watts available intensity and gelled in 148 seconds from initial exposure and had a density of 1.39 lbs./cu. ft.

The same materials were exposed in the mold 52 for 20 seconds at 915 megacycles and 1425 watts available intensity and gelled in 70 seconds from initial exposure and had a density of 1.40 lb./cu. ft. The foam had 92.1% closed cells and the fluorohydrocarbon was retained according to IR spectrograph analysis.

These compare with an identical sample reacted without the advantages of microwave exposure which had a density of 1.87 lb./cu. ft. and a gel time of 165 seconds. The foam had 91% closed cells and the fluorohydrocarbon was retained according to IR spectrograph analysis.

*Example 8.—Rigid polyether foam*

100 parts by weight of a prepolymer made from 79 parts of a polyisocyanate mixture comprising 80 parts of 2,4-toluene diisocyanate and 20 parts of 2,6-toluene diisocyanate together with 21 parts by weight of a Polyether A as defined herein, is placed in a container and is stored at about 70° F. at atmospheric pressure. A mixture of the same Polyether A is placed in another container together with an activator consisting of 1 part by weight of organo-silicone surfactant, and 38 parts of trichloromonofluoromethane wherein the proportions by weight are 87 parts of the Polyether A to 1 part of the activator. This mixture is maintained at atmospheric pressure at 70° F. Materials from the two containers are then placed in a mixing chamber in proportions by weight of 100 parts from the prepolymer container to 126 parts from the polyether container. This mixture is then discharged as a 50 gram mass into a reaction mold shown at 52 and exposed for 60 seconds at 2453 megacycles frequency and 685 watts available intensity and gelled in 278 seconds from initial exposure and has a density of 1.90 lbs./cu. ft.

This compares with an identical sample reacted without the advantages of microwave exposure which had a density of 4.22 lbs./cu. ft. and a gel time of one hour (dimensionally unstable).

*Example 9.—Flexible polyether foam*

29 parts by weight of a polyisocyanate mixture comprising 80 parts of 2,4-toluene diisocyanate and 20 parts of 2,6-toluene diisocyanate, is placed in a container and is stored at about 70° F. at atmospheric pressure. 100 parts of Polyether B as defined hereinafter is placed in another container together with an activator consisting of .4 part of dibutyl tin dilaurate and .1 part by weight of triethylamine, 2 parts of water and 1 part organo-silicone surfactant wherein the proportions by weight are 100 parts of the Polyether B to 3.5 parts activator. This mixture is maintained at atmospheric pressure at 70° F. Materials from the two containers are then placed in a mixing chamber in proportions by weight of 29 parts from the polyisocyanate container to 103.5 parts from the polyether container. This mixture is then discharged as a 50 gram mass into a reaction mold shown at 52 and exposed for 55 seconds at 2453 megacycles frequency and 685 watts available intensity and gelled in 90 seconds from initial exposure and had a density of 2.39 lbs./cu. ft.

This compares with an identical sample reacted without the advantages of microwave exposure which had a density of 3.29 lbs./cu. ft. and a gel time of 240 seconds.

Polyether B as above noted is made up of:

| | |
|---|---|
| Propylene oxide | 50 |
| Glycerol | 1 |
| OH No. | 54–58 |
| $H_2O$ Max. (percent by weight) | .1 |
| Viscosity (cps.) at 25° F. | 375–400 |
| pH | 4.5–5.5 |

(All quantities expressed in mols unless otherwise noted.)

*Example 10.—Rigid polyether foam $CO_2$ blown*

100 parts by weight of a prepolymer made from 79 parts of a polyisocyanate mixture comprising 80 parts of 2,4-toluene diisocyanate and 20 parts of 2,6-toluene diisocyanate together with 21 parts by weight of a Polyether A as defined herein, is placed in a container and is stored about 70° F. at atmospheric pressure. A mixture of the same Polyether A is placed in another container together with an activator consisting of .5 part of tetramethyl butane diamine and 1 part by weight of organosilicone surfactant and 2.5 parts of water wherein the proportions by weight are 68 parts of the Polyether A to 4 parts of the activator. This mixture is maintained at atmospheric pressure at 70° F. Materials from the two containers are then placed in a mixing chamber in proportions by weight of 100 parts from the prepolymer container to 72 parts from the polyether container. This mixture is then discharged as a 50 gram mass into a reaction mold shown at 52 and exposed for 20 seconds at 2453 megacycles frequency and 685 watts available intensity and gelled in 58 seconds from initial exposure and had a density of 1.89 lbs./cu. ft.

This compares with an identical sample reacted without the advantages of microwave exposure which had a density of 1.92 lb./cu. ft. and a gel time of 85 seconds.

While the reactions noted will occur within reasonable time limits under microwave influence without a catalyst, I prefer to employ a catalyst but in reduced quantities. The catalyst permits a somewhat faster reaction time whereby the ultimate density of the foam may be more easily controlled.

This series of tests indicates that the influence of the microwave field creates uniform activation of the reactants to promote the cross linking reaction whereby the catalyst normally used may be reduced and/or eliminated, if desired.

The microwave energy that is useful to carry out the features hereinbefore enumerated falls within the electromagnetic frequency band extending from about $10^7$ cycles/sec. to just below the infrared range, namely below $10^{13}$ cycles/sec.

In most instances, microwave energy within a frequency band of from 250 to 4500 megacycles/sec. is preferred since the lower frequencies have improved penetration abilities. When films are being exposed or cured and penetration is not a limiting factor, higher ranges of frequency may be used if desired.

In all cases, in addition to initiating and controlling reactions, microwave energy is extremely useful for curing polyurethane elastomers and foams. These materials have varying insulating qualities, and cures in open air merely heat the external surfaces and prevent loss of internal heat which, in turn, affects the cure. By utilizing microwave energy, it is possible to heat in a controlled manner throughout the mass to improve and hasten the cure as desired, and the energy absorption will vary indirectly as the complexity of the polymer increases.

The level of the absorbed microwave energy will vary with the mass being exposed, although in general, an excess of power may be made available as in the case of the foregoing examples, and the mass being exposed will determine the quantity of energy to be absorbed.

The present invention has many additional advantages over its basic concepts, namely, uniformity and control of the reaction. In foams, the use of microwaves offers more uniform cell structure throughout the mass aiding greatly in the elimination of the lattice stress patterns, typical of standard systems, by permitting full expansion before substantial polymerization. Further, it permits the manufacture of lower density foams, as desired since one of the several factors in the control of density is the viscosity of the reaction mixture at time of bubble evolution. If this is initially of a low viscosity, then much of the gas evolved for producing the foam escapes. On the other hand, if the viscosity of the reaction mixture is controlled to contain the gas, the mixture is nonuniform in cell structure due to the physical restrictions towards proper distribution of the exothermic heat of reaction.

In the present case, because of the very uniform temperature control available, it is possible to use a desired viscosity mixture and still maintain uniform reaction temperatures whereby greater expansion with resultant lower densities are possible, if desired. In all cases, uniformity of cell size and structure is closely maintained to provide greatly improved final products.

Another of the advantages of the present method is clearly shown when the microwave energy is introduced into a reaction mass including a heat vaporizable fluid, namely, trichloromonofluoromethane. This material is fluid at normal room temperatures and during the reaction must be vaporized to form the desired cells, which vaporization requires heat. In a normal reaction wherein the exothermic heat of reaction is used to vaporize the fluid, much of this heat is robbed from the reaction due to the heat required to satisfy the latent heat of vaporization of the fluid. This causes nonuniformity in the polymerization reaction since the portion of the polyurethane forming materials surrounding each cell nucleus is necessarily cooled as the fluid vaporizes. Since the heat of reaction is used to fulfill the cross linking of the ingredients, it is apparent that the absorption of any of this heat to cause vaporization of the fluid will cause a nonuniformity through the mass.

By utilizing a microwave energy I have found that the total latent heat of vaporization may be actually supplied by the microwave energy so that polymerization progresses undisturbed. This is quite clearly demonstrated by the temperatures of the reaction masses.

In two materials for forming rigid polyether foams, one blown with $CCl_3F$ (Example 6) and the other with $CO_2$, the temperature of the reactants in Example 6 after 6 minutes was 178° F., while with a $CO_2$ blown foam (Example 10) the reading under similar conditions was 297° F.

The same two initial reactants were next subjected to microwave energy for a period of 30 seconds. The temperature of the $CCl_3F$ foam was 108° F. while the temperature of the $CO_2$ blown foam was 154° F. After 6 minutes from initial exposure, the temperatures of the two masses were 230° F. and 347° F. respectively, showing substantially the same variation as when the microwave energy was not used, although the overall temperature range was consistently higher, indicating a more uniform reaction.

It is understood that the processing noted herein may be carried out intermittently or continuously.

While the embodiments of the present invention as herein disclosed constitute preferred forms, it is to be understood that other forms might be adopted.

What is claimed is as follows:

In a method for making an improved polyurethane foam and substantially eliminating lattice stress patterns therein from polyurethane foam forming ingredients including as basic exothermic reactants an organic polyisocyanate and a polymer that will cross link with said polyisocyanate to form a polyurethane together with a volatile liquid foam forming ingredient, the steps of mixing the polyurethane foam forming ingredients and immediately thereafter prior to any substantial polymerization, uniformly heating and substantially fully expanding the exothermic reaction mixture throughout substantially the entire mass by exposure of said mass to electromagnetic energy within the band width of from $10^7$ to $10^{13}$ cycles per second at a sufficient rate to supply at least the total latent heat of vaporization of the volatile liquid foam forming ingredient to substantially fully expand the foam forming materials before substantial polymerization thereof so that the polymerization progresses undisturbed.

References Cited by the Examiner

UNITED STATES PATENTS

| | | |
|---|---|---|
| 2,603,741 | 7/1952 | Seifried et al. |
| 2,841,205 | 7/1958 | Bird. |
| 2,962,183 | 11/1960 | Rill et al. |
| 2,966,469 | 12/1960 | Smythe et al. _____ 264—26 |
| 3,209,056 | 9/1965 | Jacobs _____ 264—54 XR |

ALEXANDER H. BRODMERKEL, *Primary Examiner.*

DONALD E. CZAJA, *Examiner.*

P. E. ANDERSON, *Assistant Examiner.*